J. BRUCE.
STEERING DEVICE.
APPLICATION FILED OCT. 3, 1914.
1,178,380.
Patented Apr. 4, 1916.
2 SHEETS—SHEET 1.
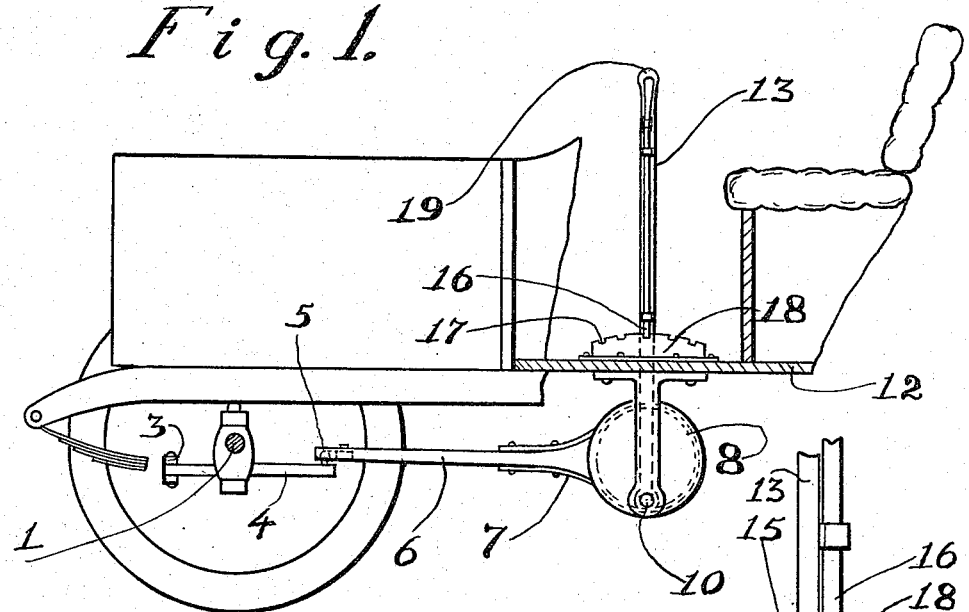
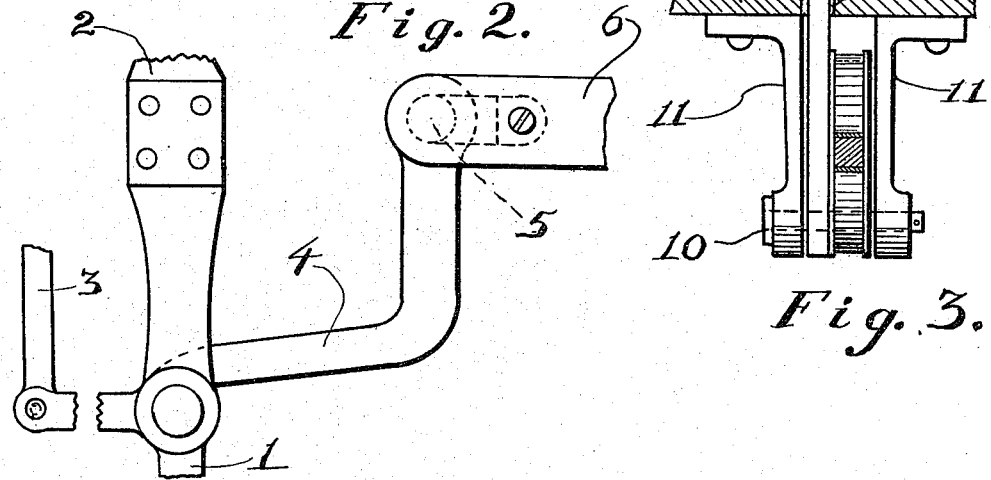
Witnesses
Ernest A. Pelham
Wm. S. Fowler
Inventor
J. Bruce.
By Randolph, Attorney

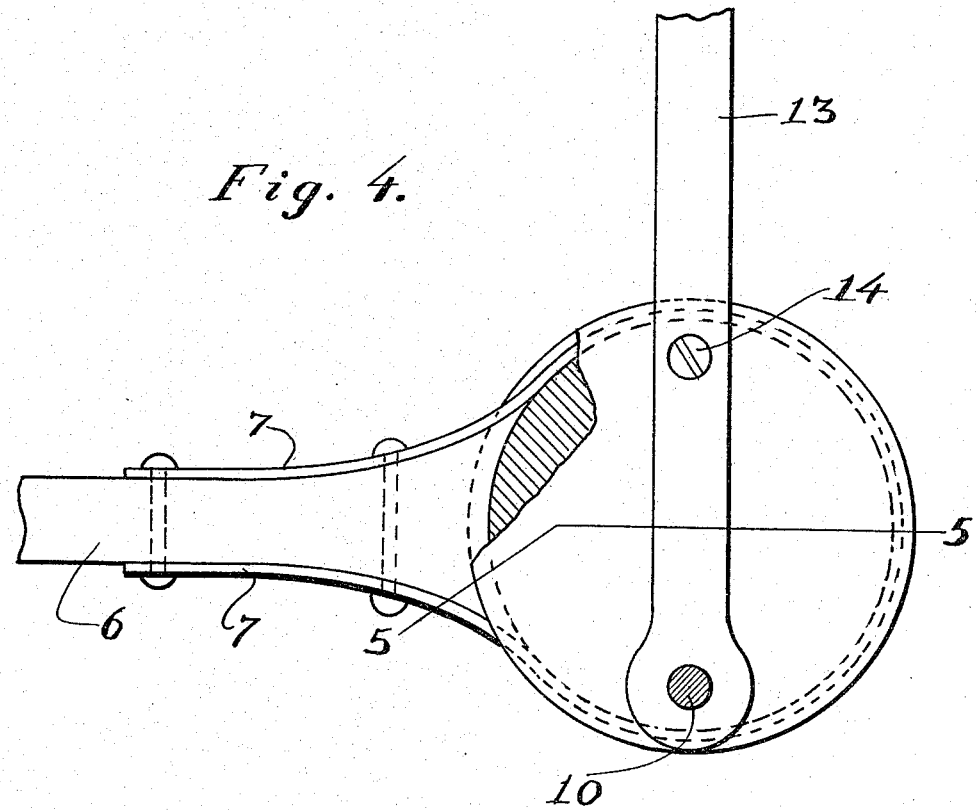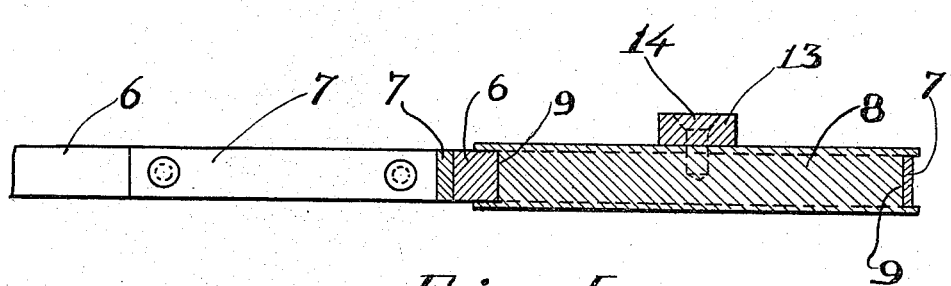

UNITED STATES PATENT OFFICE.

JAMES BRUCE, OF OKLAHOMA, OKLAHOMA.

STEERING DEVICE.

1,178,380.   Specification of Letters Patent.   Patented Apr. 4, 1916.

Application filed October 3, 1914.   Serial No. 864,766.

*To all whom it may concern:*

Be it known that I, JAMES BRUCE, a citizen of the United States, residing at Oklahoma, in the county of Oklahoma and State of Oklahoma, have invented certain new and useful Improvements in Steering Devices; and I do hereby declare the following to be a full, clear, and exact description of the invention, such as will enable others skilled in the art to which it appertains to make and use the same.

This invention comprehends certain new and useful improvements in steering devices for automobiles and other vehicles and has for its primary object to provide a device of this character which will be of extremely simple construction and operation as well as highly efficient in use.

The invention has for another object to provide a steering device including a cam with a lever for operating the cam and a strap engaged around the cam and secured to a steering rod connected with the steering members of a vehicle axle.

The invention has for a further object to provide a device of this character which may be readily applied to vehicles of various characters and which will also include means for locking the steering lever in adjusted position.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings in which—Figure 1 is a side elevation of the complete device applied to an automobile of conventional form, Fig. 2 is a fragmentary detail plan view, showing the manner in which the steering rod is connected with the steering mechanism, Fig. 3 is a rear elevation of my invention with the floor of the vehicle shown in section, Fig. 4 is a detail enlarged plan view of the cam and parts connected with the same, and Fig. 5 is a detail transverse section on the plane of line 5—5 of Fig. 4.

Referring in detail to the drawings by numerals, 1 designates a steering knuckle of an axle 2 which is connected with the opposite knuckle by the connecting rod 3 in the usual manner. To the steering knuckle 1 I have connected rigidly the curved connecting rod 4, to the free end of which I connect by means of a universal joint 5, the steering rod 6 of my improved steering device. To the rear end of the steering rod 6 is connected the opposite ends of the strap 7 which is engaged around the periphery of the cam 8 and rests in the annular channel 9 formed in the periphery of said cam 8.

The cam 8 is mounted upon the eccentric pin 10 carried in the supporting bracket arms 11 depending from the bottom 12 of the vehicle to which my steering device is applied. When the cam 8 is in normal position, the eccentric pin 10 is in the lower portion thereof.

The cam 8 is rotated in either direction upon the eccentric pin 10 by means of the steering lever 13 which has its lower end secured to one side of the cam 8, as shown at 14, while the opposite end of said steering lever projects upwardly through the slot 15 in the floor 12 adjacent one side of the vehicle, and carries the usual spring actuated locking pawl 16 normally engaged in the teeth 17 of the segment rod 18 which is secured to the floor 12 of the vehicle upon the upper face thereof, said locking pawl 16 being adapted to be withdrawn from the teeth 17 by the usual releasing finger 19, as will be readily understood by referring to the drawings.

From the foregoing it will be clearly apparent that upon releasing the locking pawl 16 from the teeth 17, the steering lever 13 may be readily swung forwardly or rearwardly to turn the steering knuckles 1 in the proper direction to turn the vehicle to the side desired, the steering lever 13 being automatically locked in adjusted position upon releasing the releasing finger 19 to permit the locking pawl 16 to again engage the proper teeth 17. It will further be evident that this cam and strap with the rod connected with the strap and the lever connected with the cam may be employed for various other purposes.

While I have shown and described the preferred embodiment of my invention, it will be understood that minor changes in the details of construction, combination and arrangement of parts may be made without departing from the spirit and scope of the invention as claimed or sacrificing any of the advantages thereof.

What is claimed is:—

A device of the class described comprising the combination with a steering knuckle and floor of the vehicle, of a pair of brackets depending from opposite sides of said floor, a pin mounted in said brackets, a cam disposed between said brackets, a lever extending downwardly through said floor and between said brackets, and being rigidly connected to said cam, a band secured around the outer periphery of said cam, a steering rod, the outer ends of said band being connected to opposite sides of the steering rod for operating the same upon movement of said cam and means positioned within the upper face of said floor for holding the steering lever in an adjusted position and the free end of the rod connected to the steering knuckle.

In testimony whereof I affix my signature in presence of two witnesses.

JAMES BRUCE.

Witnesses:
W. M. SAMGUS,
F. A. KLEEMAN.

Copies of this patent may be obtained for five cents each, by addressing the "Commissioner of Patents, Washington, D. C."